(12) United States Patent
Murayama et al.

(10) Patent No.: US 9,425,892 B2
(45) Date of Patent: Aug. 23, 2016

(54) INFORMATION PROCESSING APPARATUS, INFORMATION PROCESSING METHOD, AND PROGRAM

(71) Applicant: SONY CORPORATION, Tokyo (JP)

(72) Inventors: Kei Murayama, Tokyo (JP); Masataka Hasegawa, Tokyo (JP); Masahiro Shimizu, Saitama (JP); Satoru Osugi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/434,762

(22) PCT Filed: Oct. 7, 2013

(86) PCT No.: PCT/JP2013/077225
§ 371 (c)(1),
(2) Date: Apr. 9, 2015

(87) PCT Pub. No.: WO2014/061486
PCT Pub. Date: Apr. 24, 2014

(65) Prior Publication Data
US 2015/0304022 A1 Oct. 22, 2015

(30) Foreign Application Priority Data
Oct. 16, 2012 (JP) .................................. 2012-228913

(51) Int. Cl.
*H04B 7/26* (2006.01)
*H04W 8/00* (2009.01)
*H04W 84/18* (2009.01)

(52) U.S. Cl.
CPC ................. *H04B 7/26* (2013.01); *H04W 8/005* (2013.01); *H04W 84/18* (2013.01)

(58) Field of Classification Search
CPC ........................................................ H04B 7/26
USPC ................................................ 455/41.1–41.3
See application file for complete search history.

(56) References Cited

U.S. PATENT DOCUMENTS

2012/0317196 A1* 12/2012 Schigel et al. ................ 709/204

FOREIGN PATENT DOCUMENTS

| JP | 2003-023391 A | | 1/2003 | |
|---|---|---|---|---|
| JP | 2006-245769 A | | 9/2006 | |
| JP | 2009-201078 | * | 9/2009 | ............... H04Q 9/00 |
| JP | 2009-201078 A | | 9/2009 | |
| JP | 2012-100286 A | | 5/2012 | |

* cited by examiner

*Primary Examiner* — Tuan H Nguyen
(74) *Attorney, Agent, or Firm* — Chip Law Group

(57) ABSTRACT

The present disclosure relates to an information processing apparatus, an information processing method, and a program which are capable of swiftly starting wireless data communication between a pair of electronic devices. An information processing apparatus as one aspect of the present disclosure includes an information management unit for categorizing setting information that is obtained as a result of a connection setting process for performing wireless data communication between electronic devices as preferred information that is not deleted at a time of an initialization process or as non-preferred information that is deleted at a time of the initialization process, and managing the setting information. The present disclosure may be applied to electronic devices provided with a bluetooth interface.

9 Claims, 8 Drawing Sheets

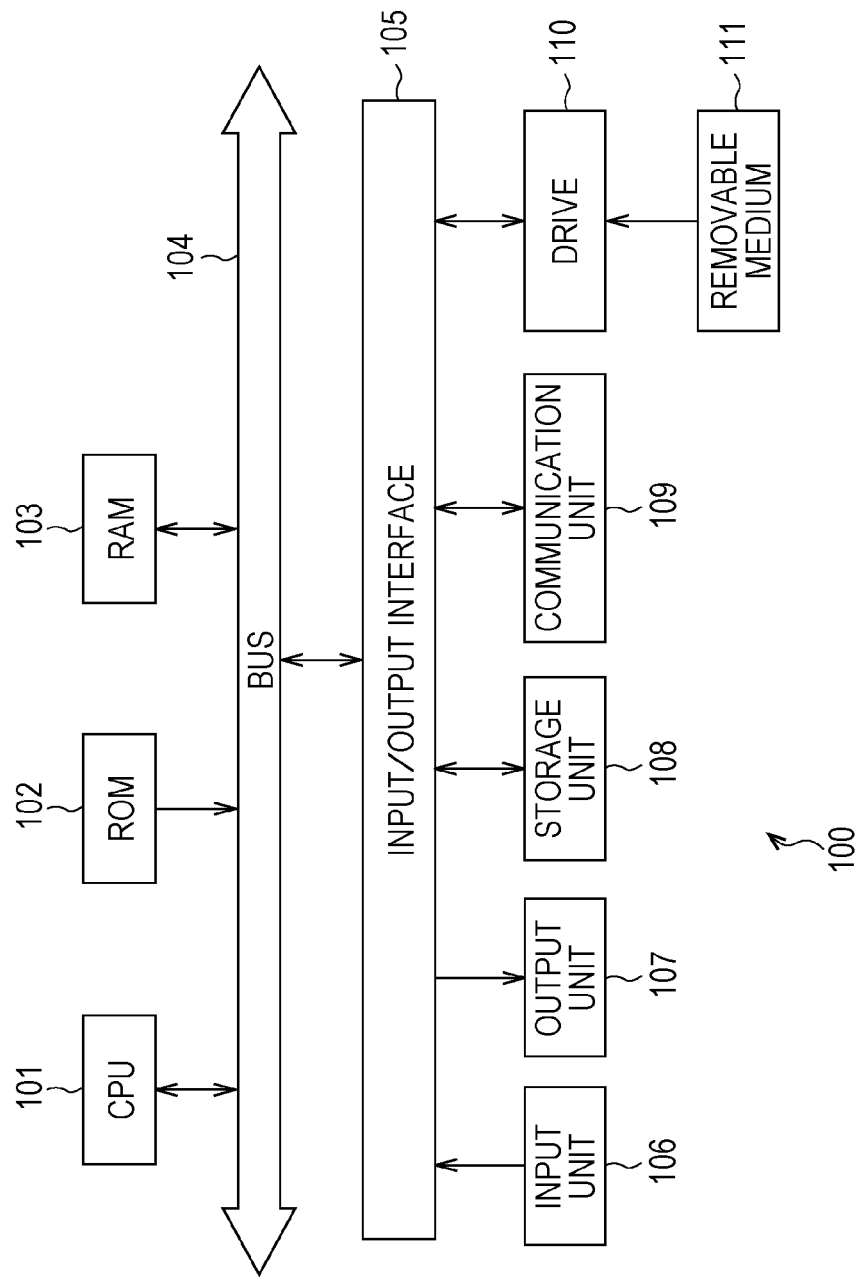

INFORMATION PROCESSING APPARATUS, INFORMATION PROCESSING METHOD, AND PROGRAM

TECHNICAL FIELD

The present disclosure relates to an information processing apparatus, an information processing method, and a program, and more particularly, to an information processing apparatus, an information processing method, and a program that are suitable when performing data communication by bluetooth (trademark), for example.

BACKGROUND ART

Bluetooth is known as a wireless communication standard that is applicable to various electronic devices, and wireless data communication between electronic devices in which a bluetooth interface is installed is realized.

Specifically, the bluetooth interface is installed in a player, a headset, a TV, a remote control, a personal computer, a mouse and the like, for example, and audio data is transmitted from the player to the headset, or a control signal is transmitted from the remote control to the TV, or the personal computer and the mouse are connected. Hereinafter, a device in which the bluetooth interface is installed will be referred to as a BT-enabled device (for example, a BT-enabled player).

As described above, a BT-enabled device is to be used together with another BT-enabled device, and thus, in many cases, the devices are sold packaged together (including a case where one is an accessory of the other). Specifically, in many cases, a BT-enabled player and a BT-enabled headset are packaged together and sold, or a BT-enabled remote control is packaged together with a BT-enabled TV as an accessory.

Now, conventionally, bluetooth wireless communication is not immediately performed when a pair of BT-enabled devices that are packaged together is unpacked and power is turned on, and a pairing process between the two BT-enabled devices has to be performed by an operation by a user.

Thus, to increase the convenience of the user, there is proposed a method of performing the pairing process before shipping on a pair of BT-enabled devices that are packaged together (for example, a BT-enabled player and a BT-enabled headset) (for example, see Patent Document 1).

By performing the pairing process before shipping between two BT-enabled devices that are packaged together, a user is enabled to immediately cause the unpacked pair of BT-enabled devices to perform wireless data communication.

CITATION LIST

Patent Document

Patent Document 1: Japanese Patent Application Laid-Open No. 2006-245769

SUMMARY OF THE INVENTION

Problems to be Solved by the Invention

Now, generally, an initialization function is installed in electronic devices, and the initialization function is also installed in the BT-enabled devices. Accordingly, if a BT-enabled device that is paired before shipping is initialized by an erroneous operation or the like, pairing information that is stored as a result of the pairing process is deleted, and wireless data communication between the pair of BT-enabled devices cannot be performed. To perform recovery, the pairing process has to be performed again between the pair of BT-enabled devices.

The present disclosure is made in view of the above circumstance, and is for swiftly starting wireless data communication between a pair of electronic devices.

Solutions to Problems

An information processing apparatus as one aspect of the present disclosure includes an information management unit for categorizing setting information that is obtained as a result of a connection setting process for performing wireless data communication between electronic devices as preferred information that is not deleted at a time of an initialization process or as non-preferred information that is deleted at a time of the initialization process, and managing the setting information.

The information processing apparatus as one aspect of the present disclosure can further include: a connection setting processing unit for performing the connection setting process for performing wireless data communication with another information processing apparatus; and an initialization processing unit for performing the initialization process, wherein the information management unit can categorize setting information that is obtained as a result of the connection setting process with the other information processing apparatus by the connection setting processing unit as the preferred information that is not deleted at a time of an initialization process or as the non-preferred information that is deleted at a time of the initialization process, and can manage the setting information.

The information management unit can manage, as the preferred information, the setting information that is generated as a result of the connection setting process performed with the other information processing apparatus which is a preferred connection counterpart with which connection is to be preferentially performed.

In a case where there is no non-preferred information at a time of activation, the information management unit can restore the setting information which is the non-preferred information based on the setting information that is managed as the preferred information.

In a case where the connection setting process is performed again with the other information processing apparatus which is the preferred connection counterpart, the information management unit can update the preferred information by the setting information that is generated again as a result.

The information management unit can manage, as the preferred information, the setting information that is generated as a result of the connection setting process that is performed with the other information processing apparatus that is shipped packaged together.

The information processing apparatus as one aspect of the present disclosure can further include a changing unit for changing the other information processing apparatus which is the preferred connection counterpart according to a predetermined selection criterion.

The changing unit can change the preferred connection counterpart based on connection history information, as the predetermined selection criterion, with respect to another information processing apparatus.

An information processing method as one aspect of the present disclosure is an information processing method for an information processing apparatus including an information management unit for managing information, the method includes: an information management step, to be performed by the information management unit, of categorizing setting information that is obtained as a result of a connection setting process for performing wireless data communication between electronic devices as preferred information that is not deleted at a time of an initialization process or as non-preferred information that is deleted at a time of the initialization process, and managing the setting information.

A program as one aspect of the present disclosure is a program for causing a computer to function as an information management unit for categorizing setting information that is obtained as a result of a connection setting process for performing wireless data communication between electronic devices as preferred information that is not deleted at a time of an initialization process or as non-preferred information that is deleted at a time of the initialization process, and managing the setting information.

In one aspect of the present disclosure, the setting information that is obtained as a result of a connection setting process for performing wireless data communication between electronic devices is categorized and managed as preferred information that is not deleted at a time of an initialization process or as non-preferred information that is deleted at a time of the initialization process.

Effects of the Invention

According to one aspect of the present disclosure, wireless data communication may be swiftly started between a pair of electronic devices.

BRIEF DESCRIPTION OF DRAWINGS

FIG. 10 is a diagram showing an example configuration of a computer.

MODE FOR CARRYING OUT THE INVENTION

In the following, the best mode for carrying out the present disclosure (hereinafter referred to as an embodiment) will be described in detail with reference to the drawings.

1. Embodiment

Figure 1:
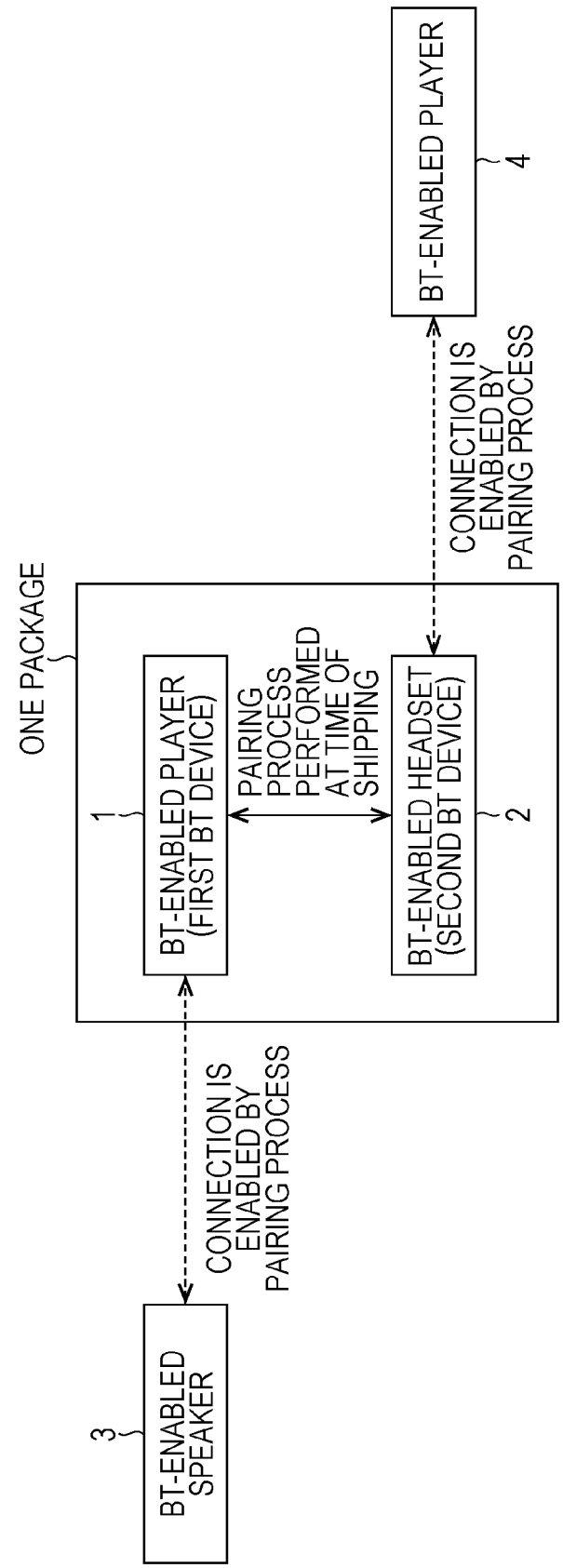
FIG. 1 is a diagram giving an outline of a BT-enabled player to which the present disclosure is applied.

FIG. 1 is a diagram giving an outline of a BT-enabled player 1 which is an embodiment of the present disclosure.

The BT-enabled player 1 is assumed to be used in combination with a BT-enabled headset 2, and the BT-enabled player 1 and the BT-enabled headset 2 undergo a pairing process before factory shipment, and are shipped packaged together.

Hereinafter, one of two BT-enabled devices that are assumed to be used in combination (for example, the BT-enabled player 1) will be referred to as a first BT device, and the other (in this case, the BT headset 2) will be referred to as a second BT device.

A user may use the BT-enabled player 1 (the first BT device) and the BT-enabled headset 2 (the second BT device) that are packaged together immediately after unpacking (wireless data communication based on bluetooth standards may be performed). That is, the user does not have to perform a pairing process on the BT-enabled player 1 (the first BT device) and the BT-enabled headset 2 (the second BT device).

Additionally, the first BT device (the BT-enabled player 1) may perform wireless data communication based on bluetooth standards with a BT-enabled device other than the second BT device (for example, a BT-enabled speaker 3 in FIG. 1) by being paired with this other BT-enabled device. Likewise, the second BT device (the BT-enabled headset 2) may also perform wireless data communication based on bluetooth standards with a BT-enabled device other than the first BT device (for example, a BT-enabled player 4 in FIG. 1) by being paired with this other BT-enabled device.

[Example Configuration of First BT Communication Unit]

Figure 2:
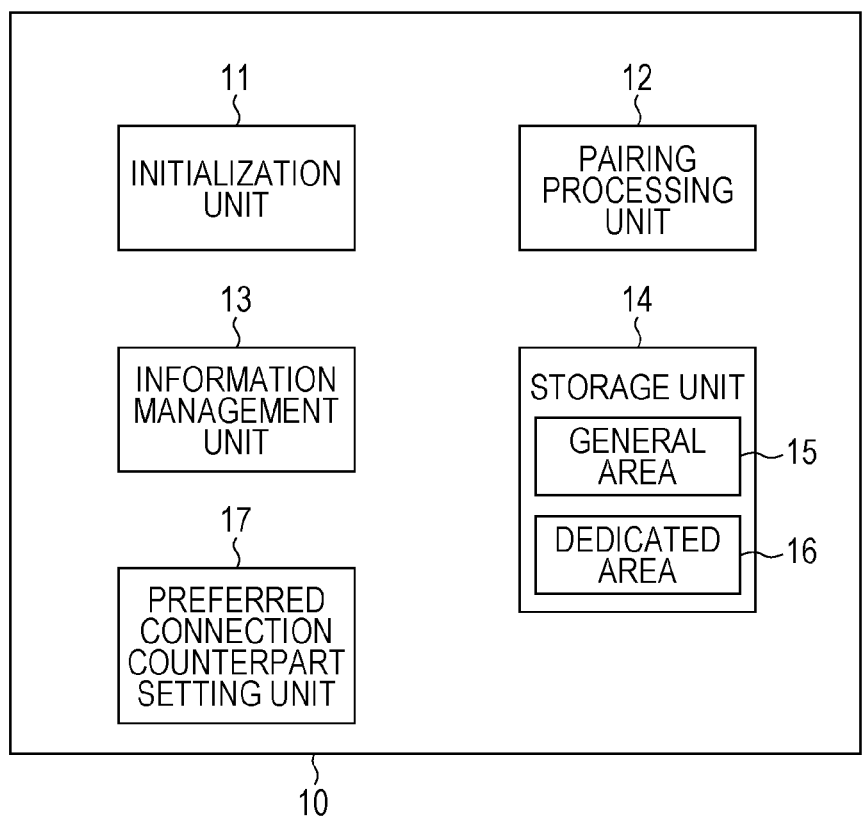
FIG. 2 is a block diagram showing an example configuration of a first BT communication unit that is installed in a BT-enabled player to which the present disclosure is applied.

FIG. 2 shows an example configuration of a first BT communication unit 10 as a bluetooth interface that is installed in at least one of the first BT device and the second BT device that are packaged together. Additionally, in the case where the first BT communication unit 10 is installed in only one of the first BT device and the second BT device, a second BT communication unit 20 (FIG. 3) as a general bluetooth interface is installed in the other.

In the following, a description will be given assuming that the first BT communication unit 10 is installed only in the first BT device (the BT-enabled player 1) of the first BT device and the second BT device.

The first BT communication unit 10 includes an initialization unit 11, a pairing processing unit 12, an information management unit 13, a storage unit 14, and a preferred connection counterpart setting unit 17.

The initialization unit 11 initializes the first BT device in which the first BT communication unit 10 is installed, and restores the first BT device to a state immediately before shipping (a state where the process at the time of factory shipment described later is completed). Additionally, at the time of this initialization, information stored in a general area 15 of the storage unit 14 is deleted, but information stored in a dedicated area 16 is not deleted.

The pairing processing unit 12 performs a pairing process with another BT-enabled device (including the second BT device), and generates pairing information that is necessary at the time of wireless data communication, based on bluetooth standards, with this other BT-enabled device. The generated pairing information includes a BDA (Bluetooth Device Address) and a link key, and is described according to a format of <header>, <space>, <BDA>, <space>, and <link key>, for example. Additionally, a different link key file is generated for every pairing process.

Furthermore, the pairing processing unit 12 stores the link key file of the generated pairing information in the general area 15 of the storage unit 14. Preparation on the side of the first BT device for the first BT device to perform wireless data communication with the second BT device is completed by storage of the link key file in the general area 15.

The information management unit 13 manages various pieces of information stored in the storage unit 14. Also, the information management unit 13 performs a pairing information writing process, a pairing information writeback process, and post-processing at the time of pairing that are described later.

The storage unit 14 includes the general area 15 from which information which is stored is to be deleted at the time of performance of the initialization process, and a dedicated area 16 from which information which is stored is not to be deleted at the time of performance of the initialization process.

A link key file that is necessary for wireless data communication with another BT-enabled device (including the second BT device) and the like are stored in the general area 15. Pairing information that is generated by a pairing process before shipping is stored in the dedicated area 16.

Additionally, instead of providing the general area 15 and the dedicated area 16 to the storage unit 14, a flag indicating non-preferred information which is to be deleted when the initialization process is performed or preferred information which is not to be deleted may be added to each of various pieces of information that are stored in the storage unit 14 and that are related to the same communication standards, and the information management unit 13 may manage, based on the flag, information to be stored in the storage unit 14.

The preferred connection counterpart setting unit 17 may set a BT-enabled device which is to be the preferred connection counterpart of the first BT device (the BT-enabled player 1) in which the first BT communication unit 10 is installed, according to a predetermined selection criterion. Additionally, at the time of shipping, the BT-enabled device to be the preferred connection counterpart is set to the second BT device (the BT-enabled headset 2) which is packaged together with the first BT device.

As the selection criteria regarding the BT-enabled device to be the preferred connection counterpart, in addition to maintenance of the setting at the time of shipping that takes the second BT device as the preferred connection counterpart, the following may be applied:

specification of the one with which the pairing process was first performed after shipping as the preferred connection counterpart;

arbitrary specification of the preferred connection counterpart by the user;

specification of the one of a predetermined manufacturer (the same manufacturer as that of the first BT device) as the preferred connection counterpart;

specification of the preferred connection counterpart based on a BT profile of the BT-enabled device;

specification of the preferred connection counterpart based on the application that is executed by the first BT device;

specification of the preferred connection counterpart based on connection history information; more specifically, specification, as the preferred connection counterpart, of the one that is at a higher rank than a predetermined rank after arrangement of pieces of connection information in the order from the highest frequency;

specification, as the preferred connection counterpart, of the one whose frequency is above a threshold regarding frequency after setting of the threshold;

specification, as the preferred connection counterpart, of the one that is at a higher rank than a predetermined rank after arrangement of pieces of connection information in the order from the longest total connection time; and specification, as the preferred connection counterpart, of the one whose total connection time is above a threshold regarding total connection time after setting of the threshold.

[Example Configuration of Second BT Communication Unit]

Figure 3:
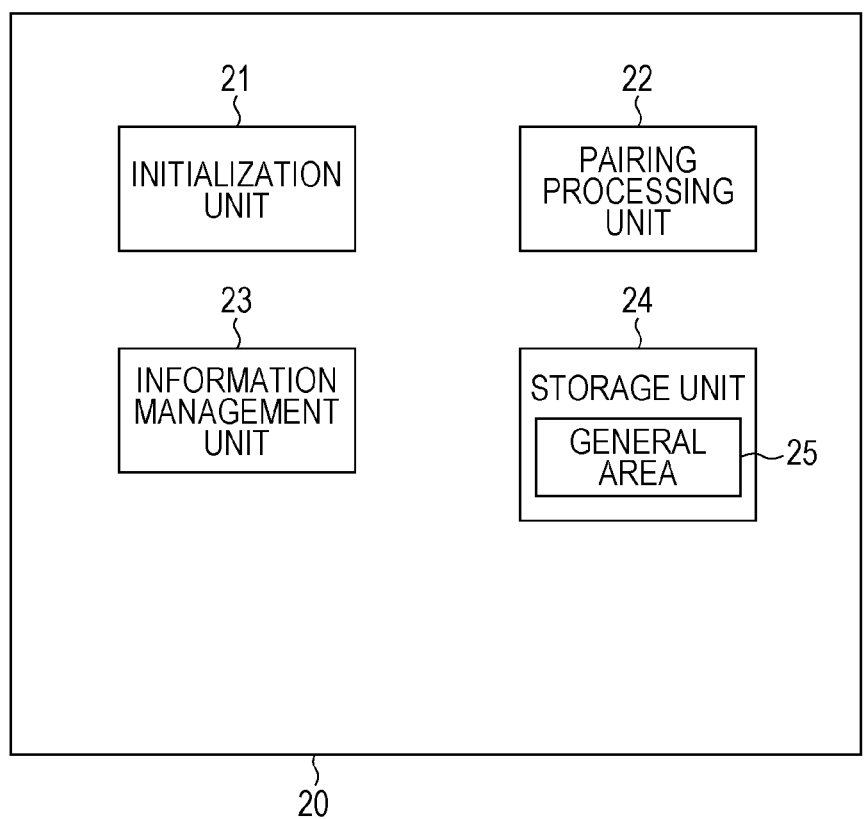
FIG. 3 is a block diagram showing an example configuration of a second BT communication unit that is installed in a general BT-enabled device.

Next, FIG. 3 shows an example configuration of the second BT communication unit 20 as a general bluetooth interface that is installed in the second BT device (the BT-enabled headset 2) that is packaged together with the first BT device (the BT-enabled player 1) in which the first BT communication unit 10 installed or in another BT-enabled device (a BT-enabled speaker 3, a BT-enabled player 4 or the like in FIG. 1).

The second BT communication unit 20 includes an initialization unit 21, a pairing processing unit 22, an information management unit 23, and a storage unit 24.

The initialization unit 21 initializes the BT-enabled device in which the second BT communication unit 20 is installed (for example, the BT-enabled headset 2 as the second BT device), and restores the BT-enabled device to a state immediately before shipping. Additionally, at the time of this initialization, information stored in a general area 25 of the storage unit 24 is deleted.

The pairing processing unit 22 performs a pairing process with another BT-enabled device (including the first BT device), and generates pairing information that is necessary at the time of wireless data communication, based on bluetooth standards, with this other BT-enabled device. The generated pairing information includes a BDA and a link key file. Also, the pairing processing unit 22 stores the link key file of the generated pairing information in the general area 25 of the storage unit 24.

Additionally, in the case where there is no link key file in the general area 25 of the storage unit 24, the pairing processing unit 22 desirably swiftly shifts to a pairing mode for performing the pairing process.

The information management unit 23 manages various pieces of information stored in the storage unit 24. A link key file which is included in pairing information and which is generated by the pairing process with another BT-enabled device (including the second BT device) is stored in the storage unit 24. Additionally, information such as the link key file stored in the general area 25 of the storage unit 24 is deleted when the initialization process is performed.

[Description of Operation]

Next, of the first BT device (the BT-enabled player 1) and the second BT device (the BT-enabled headset 2) that are packaged together, the operation of the one in which the first BT communication unit 10 is installed (in the case of the present embodiment, the first BT device (the BT-enabled player 1)) will be described.

Figure 4:
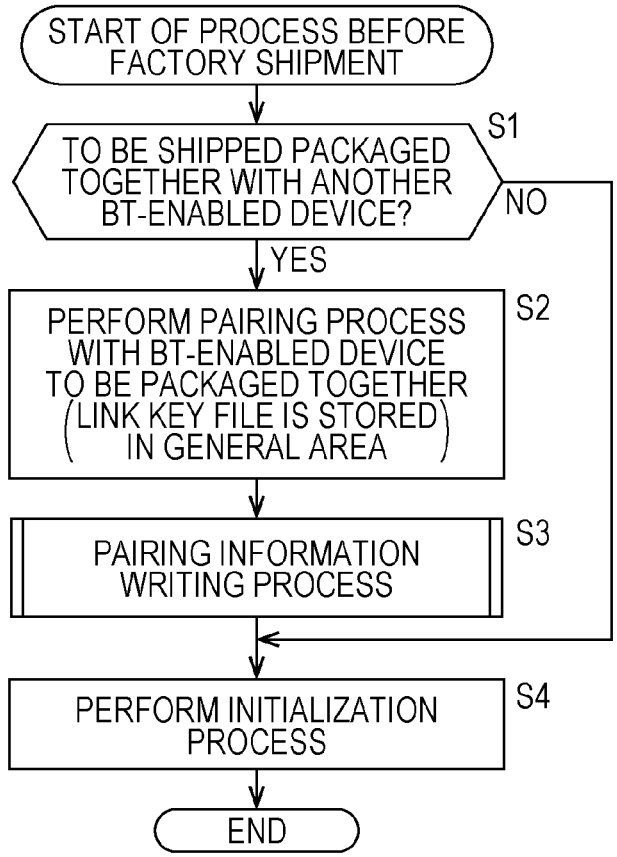
FIG. 4 is a flow chart describing a process before factory shipment.

FIG. 4 is a flow chart describing a process before factory shipment of the first BT device. This process before factory shipment is started under control of a manufacturing device installed in the factory.

In step S1, the manufacturing device determines whether or not the first BT device is a product to be packaged together with another BT-enabled device. In the case where the determination result is positive, the process proceeds to step S2, and in the case where the determination result is negative, steps S2 and S3 are skipped. In this case, the first BT device is to be packaged together with the second BT device as a pair, and thus, the process proceeds to step S2.

In step S2, the pairing processing unit 12 of the first BT communication unit 10 performs the pairing process with the second BT device to be packaged together, under the control of the manufacturing device. Pairing information (a BDA and a link key file) with the second BT device is generated according to this pairing process, and the link key file that is necessary for performing wireless data communication with the second BT device is stored in the general area 15 of the storage unit 14 of the first BT communication unit 10. Additionally, at the same time, the common link key file is stored in the general area 25 of the storage unit 24 of the second BT communication unit 20 of the second BT device.

In step S3, the information management unit 13 performs a pairing information writing process under the control of the manufacturing device.

Figure 5:
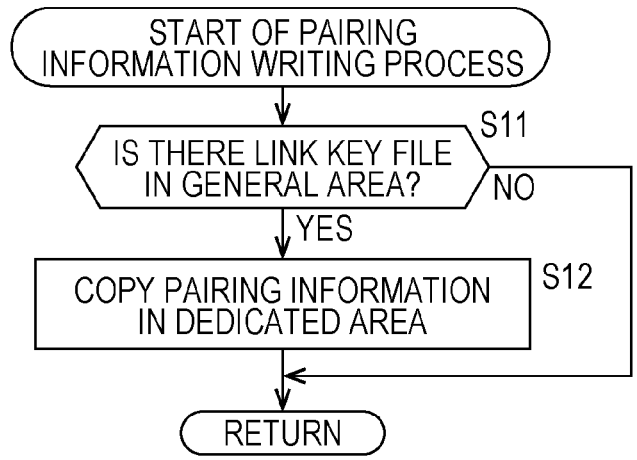
FIG. 5 is a flow chart describing a pairing information writing process.

FIG. 5 is a flow chart describing a pairing information writing process.

In step S11, the information management unit 13 determines whether or not a link key file is present (stored) in the general area 15 of the storage unit 14. In the case where the determination result is positive, the process proceeds to step S12, and in the case where the determination result is negative, the pairing information writing process is ended. In this case, a link key file is stored in the general area 15 of the storage unit 14 by the pairing process in step S2, and thus, the process proceeds to step S12.

Additionally, for example, in the case where the first BT device is to be shipped as a single item without being packaged together with the second BT device, step S2 described above is skipped, and there is no link key file in the general area 15 of the storage unit 14. Accordingly, in this case, the pairing information writing process is ended.

In step S12, the information management unit 13 stores (copies) the pairing information generated in the pairing process in step S2 in the dedicated area 16 of the storage unit 14. The pairing information writing process is thereby ended. The process is then returned to step S4 in FIG. 4.

In step S4 after the pairing information writing process, the initialization unit 11 of the first BT communication unit 10 performs the initialization process under the control of the manufacturing device. Information (a link key file, etc.) stored in the general area 15 of the storage unit 14 is deleted by this initialization process. On the other hand, the pairing information in the dedicated area 16 is retained without being deleted.

The process before factory shipment is thereby ended, and the first BT device is shipped packaged together with the second BT device.

Figure 6:
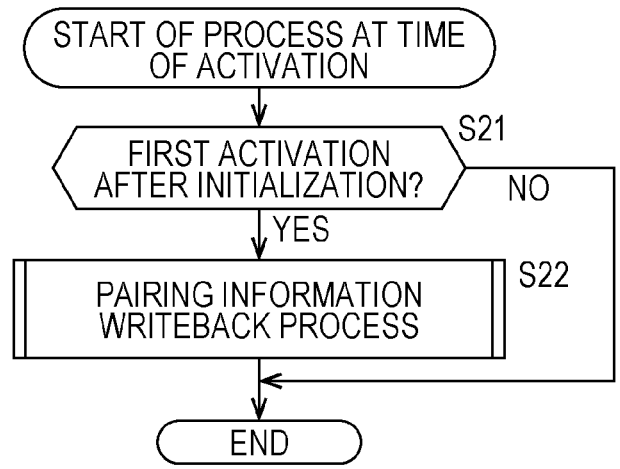
FIG. 6 is a flow chart describing a process at the time of activation.

Next, FIG. 6 is a flow chart describing a process at the time of activation of the first BT device. This process at the time of activation is started when the first BT device is activated (when the power is turned on).

In step S21, the information management unit 13 determines whether or not the current activation is the first activation after the initialization process, and in the case where it is determined to be the first activation, the process proceeds to step S22. In the case where it is determined to be not the first activation, the process in step S22 is not performed, and the process at the time of activation is ended.

In the following, a case where the first BT device which has been shipped from a factory is first activated will be described, but as described above, the initialization process is performed in step S4 in the process before factory shipment, and in this case, the process proceeds to step S22. In step S22, the information management unit 13 performs a pairing information writeback process.

Figure 7:
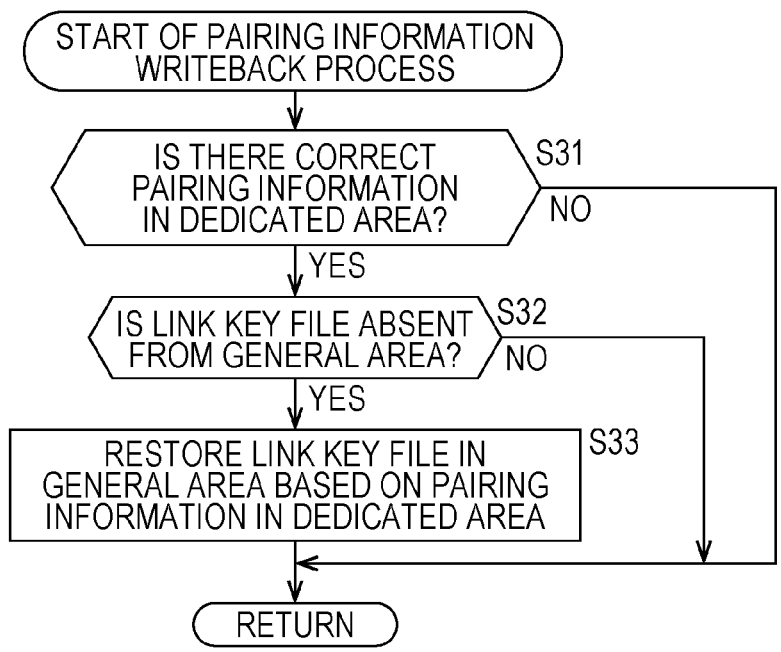
FIG. 7 is a flow chart describing a pairing information writeback process.

FIG. 7 is a flow chart describing a pairing information writeback process.

In step S31, the information management unit 13 determines whether or not correct pairing information is present (stored) in the dedicated area 16 of the storage unit 14. This determination is performed based on whether a legitimate header is described, for example. In the case where the determination result is positive, the process proceeds to step S32, and in the case where it is negative, the pairing information writeback process is ended.

In this case, since the pairing information is stored in the dedicated area 16 by the pairing information writing process in the process before factory shipment, the process proceeds to step S32. In step S32, the information management unit 13 checks that there is no link key file in the general area 15 of the storage unit 14. If this is confirmed, the process proceeds to step S33, and if this is not confirmed, the pairing information writeback process is ended.

In this case, since the general area 15 is cleared by the pairing information writing process in the process before factory shipment and there is no link key file, the process proceeds to step S33.

In step S33, the information management unit 13 restores the link key file in the general area 15 based on the pairing information stored in the dedicated area 16 of the storage unit 14. The pairing information writeback process is thereby ended, and the process at the time of activation is ended.

In this manner, by the link key file being restored in the general area 15 of the storage unit 14, preparation on the side of the first BT device for the first BT device to perform wireless data communication with the second BT device is completed. For its part, the second BT device, which is the wireless data communication counterpart, has the common link key file stored in the general area 25 of the storage unit 24 of the second BT communication unit 20 by the pairing process in step S2 before factory shipment. Accordingly, the first BT device and the second BT device may immediately perform wireless data communication at this stage.

Additionally, the process in step S21 may be omitted, and the pairing information writeback process in step S22 may be performed at every activation. In this case, for example, when the pairing information writeback process in step S22 is performed at the time of second activation after the initialization process, it is determined in the process in step S31 that correct pairing information is present in the dedicated area 16 of the storage unit 14, and the pairing information writeback process is immediately ended.

Now, the pairing process with the second BT device may be performed again after shipping due to the misunderstanding of the user, an erroneous operation or the like, for example.

In this case, the common link key file that is stored in the general area 15 of the storage unit 14 of the first BT communication unit 10 of the first BT device and the general area 25 of the storage unit 24 of the second BT communication unit 20 of the second BT device is updated by the pairing process at this time, but the wireless data communication between the first BT device and the second BT device is not affected.

However, for example, if the initialization process is then performed on the first BT device due to the misunderstanding of the user, an erroneous operation or the like, the following inconvenience is caused.

That is, the process at the time of activation described above is started at the time of the next activation, and the link key file at the time of factory shipment is restored in the general area 15 of the storage unit 14 by the pairing information writeback process in step S22. On the other hand, the link key file in the general area 25 of the storage unit 24 of the second BT device is updated by the pairing process which has been performed again, and the link key files do not coincide. Thus, wireless data communication cannot be performed between the first BT device and the second BT device.

Accordingly, post-processing for a case where the pairing process is performed between the BT-enabled devices (including the second BT device) after shipping will be described, the post-processing being for preventing occurrence of such an inconvenience (hereinafter referred to as the post-processing at the time of pairing).

Figure 8:
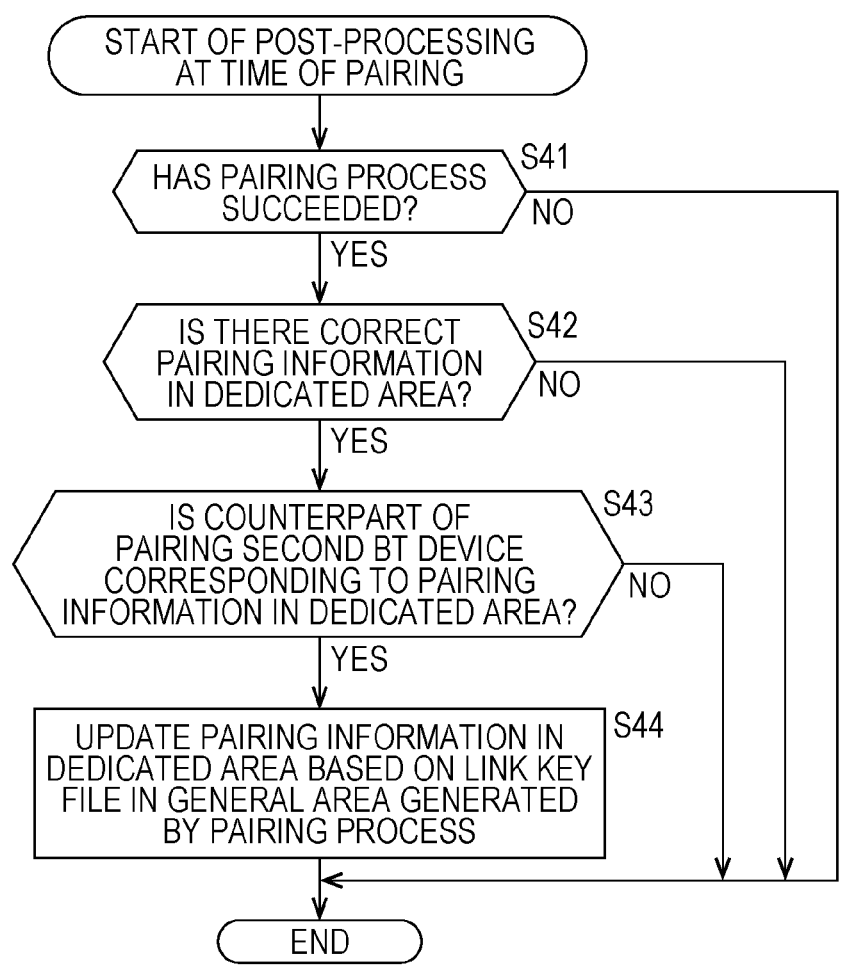
FIG. 8 is a flow chart describing post-processing at the time of pairing.

FIG. 8 is a flow chart describing the post-processing at the time of pairing. This post-processing at the time of pairing is performed immediately after the pairing process after shipping which is the trigger.

In step S41, the information management unit 13 determines whether or not the current pairing process, which is the trigger for the start of the post-processing at the time of pairing, has succeeded. Specifically, success is determined in the case where the link key file in the general area 15 of the storage unit 14 is updated. If success is determined, the process proceeds to step S42.

In step S42, the information management unit 13 determines whether or not correct pairing information is present (stored) in the dedicated area 16 of the storage unit 14. This determination is performed based on whether a legitimate header is described, for example. In the case where the determination result is positive, the process proceeds to step S42. In this case, since the pairing information is stored in the dedicated area 16 by the pairing information writing process in the process before factory shipment, the process proceeds to step S43.

In step S43, the information management unit 13 determines whether or not the counterpart of the current pairing process, which is the trigger for the start of the post-processing at the time of pairing, is the BT-enabled device corresponding to the pairing information present in the dedicated area 16 of the storage unit 14 (in this case, the second BT device). Specifically, positive is determined if the BDA in the pairing information generated by the current pairing process and the BDA in the pairing information present in the dedicated area 16 coincide. In the case where the determination result is positive, the process proceeds to step S44.

In step S44, the information management unit 13 updates the pairing information in the dedicated area 16 by replacing the part of the link key file in the pairing information stored in the dedicated area 16 with the link key file in the general area 15 updated by the current pairing process. The post-processing at the time of pairing is thereby ended.

Additionally, in the case where the determination result in step S41 is negative, or in the case where the determination result in step S42 is negative, or in the case where the determination result in step S43 is negative, the post-processing at the time of pairing is ended at that point.

With the post-processing at the time of pairing, even if the pairing process with the second BT device is performed again after shipping, and the initialization process is further performed, the pairing information in the dedicated area 16 of the storage unit 14 is updated by the new link key file.

Accordingly, the link key file that is restored in the general area 15 by the process at the time of later activation will coincide with the one stored in the general area 25 of the storage unit 24 of the second BT device in the current state. Thus, the inconvenience that the wireless data communication cannot be performed between the first BT device and the second BT device may be prevented from occurring.

Figure 9:
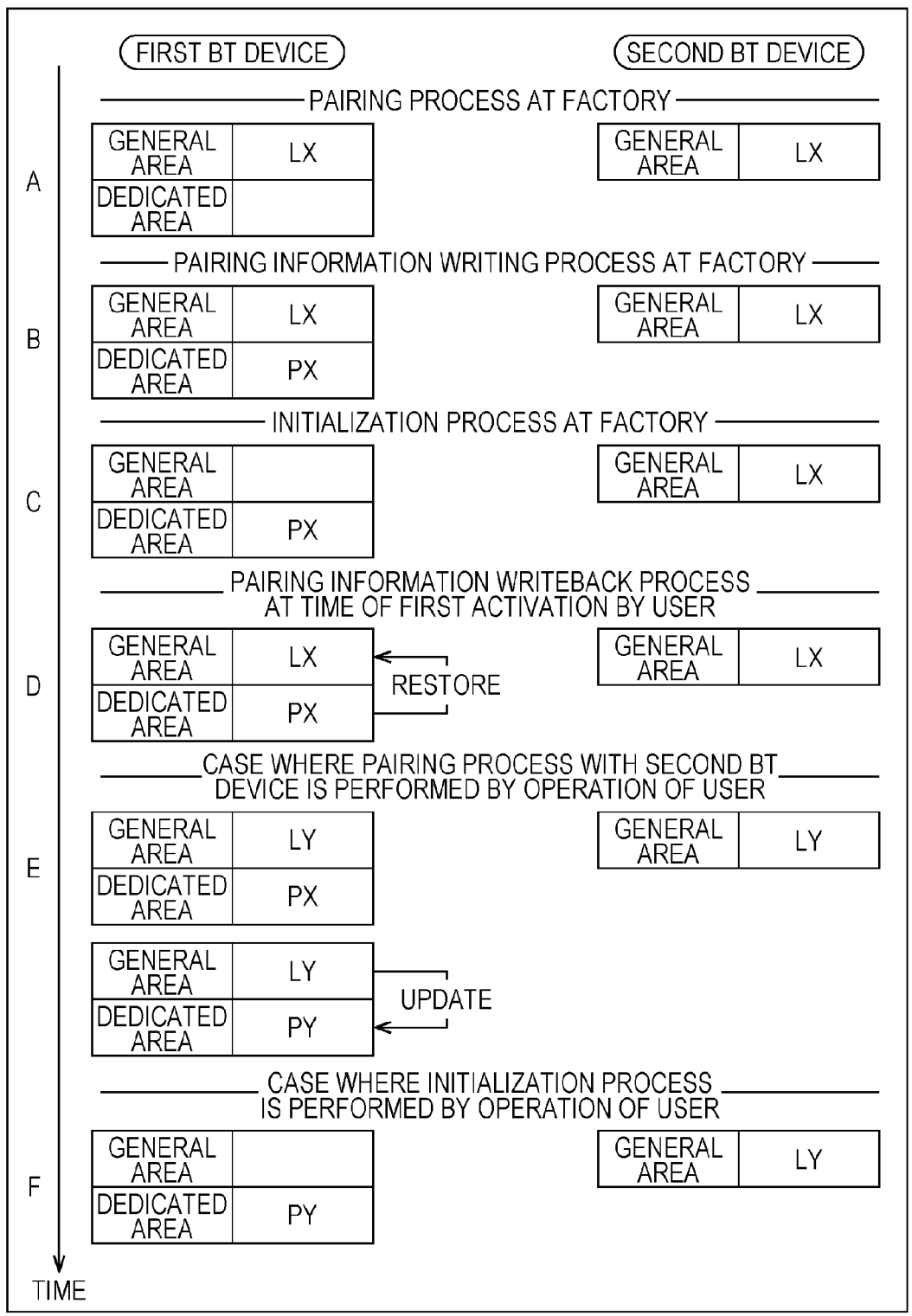
FIG. 9 is a diagram chronologically showing pieces of information to be respectively stored in a storage unit 14 of a first BT device and a storage unit 24 of a second BT device.

FIG. 9 is a diagram chronologically showing pieces of information to be stored respectively in the storage unit 14 of the first BT device and the general area 25 of the storage unit 24 of the second BT device in the case where each of the processes described above is performed.

First, when the pairing process is performed at the factory (step S2 in FIG. 4), pairing information PX is generated, and a common link key file LX included in the pairing information PX is stored in the general area 15 of the first BT device and the general area 25 of the second BT device, as shown by A in FIG. 9. Next, when the pairing information writing process in step S3 is performed, the pairing information PX is copied in the dedicated area 16 of the first BT device, as shown by B in FIG. 9.

Furthermore, when the initialization process in step S4 is performed, the general area 15 of the first BT device is cleared, and the pairing information PX in the dedicated area 16 is retained, as shown by C in FIG. 9. The first BT device and the second BT device are shipped packaged together in this state.

When a user unpacks, and activates, the first BT device and the second BT device which have been shipped packaged together, the link key file LX is restored, by the pairing information writeback process in step S22 in FIG. 6, in the general area 15 based on the pairing information PX in the dedicated area 16 of the first BT device, as shown by D in FIG. 9. On the other hand, the common link key file LX is stored in the general area 25 of the second BT device, and thus, wireless data communication may be performed between the first BT device and the second BT device without the pairing process.

Then, when the pairing process is performed again between the first BT device and the second BT device by an erroneous operation or the like, pairing information PY is newly generated, and a common link key file LY included in the pairing information PY is stored in the general area 15 of the first BT device and the general area 25 of the second BT device, as shown by E in FIG. 9. Furthermore, the pairing information PX in the dedicated area 16 of the first BT device is updated to the pairing information PY based on the link key file LY in the general area 15 by the post-processing at the time of pairing in FIG. 8.

Then, when the first BT device performs the initialization process by an erroneous operation or the like, the general area 15 of the first BT device is cleared, and the pairing information PY in the dedicated area 16 is retained, as shown by F in FIG. 9. This pairing information PY corresponds to the link key file LY that is stored in the general area 25 of the second BT device in the current state. Accordingly, at the time of the next activation, the link key file LY is restored in the general area 15 of the first BT device, and thus, wireless data communication may be performed between the first BT device and the second BT device without performing the pairing process.

Additionally, in the description above, the pairing information with the second BT device that is packaged together is retained in the dedicated area 16 of the first BT device, but this may be changed. Specifically, the preferred connection counterpart setting unit 17 may set a BT-enabled device which is a preferred connection counterpart of the first BT device according to a predetermined selection criterion, and the pairing information with the counterpart may be retained.

[Example Modification]

In the present embodiment, the first BT device is the BT-enabled player 1, and the second BT device is the BT-enabled headset 2, but the first BT device and the second BT device may merely be BT-enabled devices that are packaged together. For example, the first BT device may be a BT-enabled TV, and the second BT device may be a BT-enabled remote control.

Also, the present disclosure may be applied to electronic devices that perform wireless data communication by wireless data communication standards other than the bluetooth standards, such as WiFi Direct, Wi-Fi Protected Setup for Wi-Fi ad-hoc communication, WEP, Wireless HDMI (registered trademark), Wireless USB and the like.

In the present embodiment, the first BT communication unit 10 is installed in the first BT device (the BT-enabled player 1), and the second BT communication unit 20 is installed in the second BT device (the BT-enabled headset 2), but the opposite is also possible. Also, the first BT communication unit 10 may be installed in both the first BT device and the first BT device.

Additionally, in the case where the first BT communication unit 10 is installed in only the first BT device, as in the present embodiment, the pairing process becomes necessary when the second BT device is initialized. To facilitate execution of this pairing process, the second BT device may be made to swiftly shift to a pairing mode for performing the pairing process in the case where there is no link key file in the general area 25, and the first BT device may be made to start the pairing process in the event of failure of connection with the second BT device.

Also, with respect to the first BT device of the present embodiment, a restriction may be imposed on the number of counterparts with which the pairing process may be performed. Normally, in the case where there is a restriction on the number of counterparts with which the pairing process is possible, and the upper limit is reached, pieces of pairing information are deleted from the oldest, but in the present embodiment, it is possible to not delete the pairing information with the second BT device which was stored at the time of shipping.

Furthermore, various processes of the present disclosure other than the pairing process may be performed by an information processing apparatus (for example, a cloud server provided on the Internet) other than the first BT device and the second BT device on which the pairing process has been performed.

Additionally, the series of processes described above by the first BT communication unit 10 installed in the first BT device may be performed by hardware, or by software. In the case of performing the series of processes by software, a program constituting the software is installed in the computer. Here, the computer may be a computer that is built in dedicated hardware, a general-purpose personal computer capable of performing various functions by installation of various programs, or the like.

FIG. 10 is a block diagram showing an example configuration of hardware of a computer which performs the series of processes described above according to a program.

In the computer, a CPU (Central Processing Unit) 101, a ROM (Read Only Memory) 102, and a RAM (Random Access Memory) 103 are interconnected by a bus 104.

An input/output interface 105 is further connected to the bus 104. An input unit 106, an output unit 107, a storage unit 108, a communication unit 109, and a drive 110 are connected to the input/output interface 105.

The input unit 106 is configured from a keyboard, a mouse, a microphone, or the like. The output unit 107 is configured from a display, a speaker, or the like. The storage unit 108 is configured from a hard disk, a non-volatile memory, or the like. The communication unit 109 is configured from a network interface, or the like. The drive 110 drives a removable medium 111 such as a magnetic disk, an optical disk, a magneto-optical disk, a semiconductor memory, or the like.

With the computer having the configuration described above, the CPU 101 loads a program stored in the storage unit 108, for example, into the RAM 103 via the input/output interface 105 and the bus 104, and executes the program to thereby perform the series of processes described above.

Additionally, the program to be executed by the computer may be a program according to which the processes are chronologically performed according to the order described in the present specification, or a program according to which the processes are performed in parallel or at necessary timings such as when there is an invocation.

Additionally, the embodiment of the present disclosure is not limited to the embodiment described above, and various changes may be made without departing from the scope of the present disclosure.

REFERENCE SIGNS LIST

1 BT-enabled player (first BT device)
2 BT-enabled headset (second BT device)
10 First BT communication unit
11 Initialization unit
12 Pairing processing unit
13 Information management unit
14 Storage unit
15 General area
16 Dedicated area
17 Preferred connection counterpart setting unit
20 Second BT communication unit
21 Initialization unit
22 Pairing processing unit
23 Information management unit
24 Storage unit
25 General area
100 Computer
101 CPU

The invention claimed is:

1. An information processing apparatus comprising:
an information management unit configured to categorize setting information that is obtained as a result of a connection setting process for performing wireless data communication between electronic devices;
a connection setting processing unit configured to perform the connection setting process for performing wireless data communication with another information processing apparatus; and
an initialization processing unit configured to perform an initialization process,
wherein the information management unit is configured to categorize the setting information that is obtained as a result of the connection setting process with the other information processing apparatus by the connection setting processing unit as preferred information that is not deleted at a time of the initialization process or as non-preferred information that is deleted at a time of the initialization process, and to manage the setting information.

2. The information processing apparatus according to claim 1, wherein the information management unit is configured to manage, as the preferred information, the setting information that is generated as a result of the connection setting process performed with the other information processing apparatus which is a preferred connection counterpart with which connection is to be preferentially performed.

3. The information processing apparatus according to claim 1, wherein, in a case where there is no non-preferred information at a time of activation, the information management unit is configured to restore the setting information which is the non-preferred information based on the setting information that is managed as the preferred information.

4. The information processing apparatus according to claim 1, wherein, in a case where the connection setting process is performed again with the other information processing apparatus which is a preferred connection counterpart, the information management unit is configured to update the preferred information by the setting information that is generated again as a result.

5. The information processing apparatus according to claim 1, wherein the information management unit is configured to manage, as the preferred information, the setting information that is generated as a result of the connection setting process that is performed with the other information processing apparatus that is shipped packaged together.

6. The information processing apparatus according to claim 1, further comprising:
 a changing unit configured to change the other information processing apparatus which is a preferred connection counterpart according to a predetermined selection criterion.

7. The information processing apparatus according to claim 6, wherein the changing unit is configured to change the preferred connection counterpart based on connection history information, as the predetermined selection criterion, with respect to the other information processing apparatus.

8. An information processing method for an information processing apparatus, the method comprising:
 categorizing setting information that is obtained as a result of a connection setting process for performing wireless data communication between electronic devices;
 performing the connection setting process for performing wireless data communication with another information processing apparatus;
 performing an initialization process, wherein the categorization of the setting information that is obtained as a result of the connection setting process with the other information processing apparatus categorizes the setting information as preferred information that is not deleted at a time of the initialization process or as non-preferred information that is deleted at a time of the initialization process; and
 managing the setting information.

9. A non-transitory computer-readable storage medium having stored thereon a set of computer-executable instructions for causing a computer to perform the steps comprising:
 categorizing setting information that is obtained as a result of a connection setting process for performing wireless data communication between electronic devices;
 performing the connection setting process for performing wireless data communication with another information processing apparatus;
 performing an initialization process, wherein the categorization of the setting information that is obtained as a result of the connection setting process with the other information processing apparatus categorizes the setting information as preferred information that is not deleted at a time of the initialization process or as non-preferred information that is deleted at a time of the initialization process; and
 managing the setting information.

* * * * *